United States Patent [19]

Ouhayoun

[11] Patent Number: 4,723,249
[45] Date of Patent: Feb. 2, 1988

[54] FREQUENCY STABILIZED PULSED LASER SYSTEM

[75] Inventor: Michel M. Ouhayoun, Paris, France

[73] Assignee: Societe Anonyme de Telecommunications, Paris, France

[21] Appl. No.: 801,008

[22] Filed: Nov. 22, 1985

[30] Foreign Application Priority Data

Nov. 30, 1984 [FR] France ............... 84 18266

[51] Int. Cl.⁴ .................................................. H01S 3/13
[52] U.S. Cl. ........................................ 372/32; 372/18; 372/29
[58] Field of Search ............... 372/32, 83, 99, 18, 372/29; 307/428

[56] References Cited

U.S. PATENT DOCUMENTS

| | | | |
|---|---|---|---|
| 3,644,845 | 2/1972 | Harris | 307/428 |
| 3,842,367 | 10/1974 | Schlossberg | 372/32 |
| 4,375,685 | 3/1983 | Le Goff et al. | 372/32 |
| 4,493,086 | 1/1985 | Jain et al. | 372/99 |

FOREIGN PATENT DOCUMENTS 0009108 6/1980 European Pat. Off. .

OTHER PUBLICATIONS

P. A. Belanger et al, Applied Optics, vol. 19, No. 4, Dec. 15, 1980.

R. C. Lind et al, Optics Letters, vol. 6, No. 11, Nov. 1981.

J. Auyeung, et al, IEEE Journal of Quantum Electronics, vol. QE-15, (1979), Oct. Nr. 10, New York.

Primary Examiner—James W. Davie
Assistant Examiner—Bertha Randolph
Attorney, Agent, or Firm—Jacobs & Jacobs

[57] ABSTRACT

A frequency stabilized pulsed laser system useful for heterodynes telemetry comprises an amplifying medium (21), between a mirror (27) and a four wave mixing phase conjugate mirror (30). The non linear medium of mirror (30) is a part of the laser medium (21), because of the presence of a lens (31). The mirror (30) is pumped by the direct beam of a continuous laser (29) and the reflected beam from the mirror (27). The light emission of the laser exits through an optical isolator (28).

13 Claims, 2 Drawing Figures

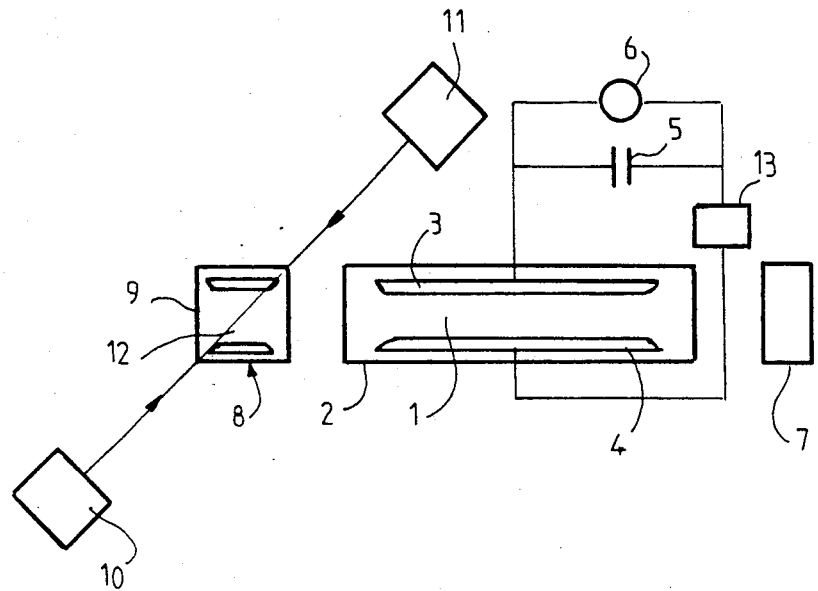
FIG_1
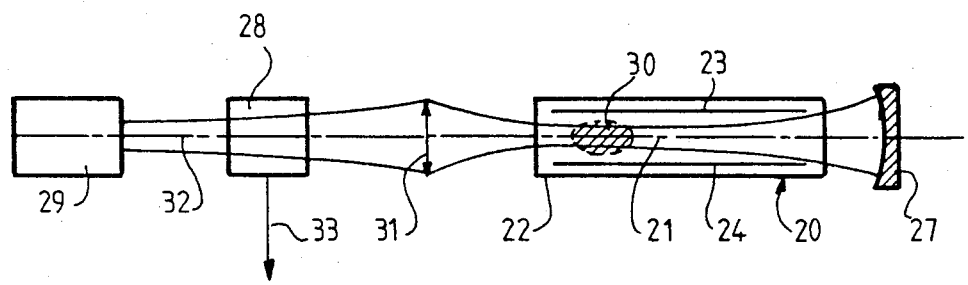
FIG_2

FREQUENCY STABILIZED PULSED LASER SYSTEM

BACKGROUND OF THE INVENTION

1. Field of the Invention

The present invention relates to a pulsed laser, comprising a first laser medium with pulsed excitation in a resonant cavity formed between two mirrors one of which is a mirror providing phase conjugation by mixing four waves, said phase conjugation mirror comprising a secondary non linear medium associated with at least one pumping laser for sending two pumping beams incident on the secondary medium in two opposite directions and at the same frequency.

2. Description of the Prior Art

A pulsed laser may be considered a laser whose gas medium, at high pressure, at least of the order of an atmosphere, is subjected to a pulsed transverse excitation. Such a laser is called a TEA (transversely excited atmospheric) laser. The pulsed transverse excitation is provided by the electrical discharge of a capacitor generally by means of two longitudinal electrodes or plates extending in the gas medium.

The advantage of TEA lasers is to emit very brief pulses which are advantageously used in particular in telemetry. Thus, for example pulses may be obtained whose main peak has a duration of the order of 10 ns, the high pressure of the gas medium allowing pulses to be obtained with an extremely steep rising front, of a duration of the order of 20 ns.

For measuring distances, TEA lasers are perfectly suitable. The measurement of the time elapsing between the emission of a TEA laser pulse and reception of its echo from a target gives the distance of this target. On the other hand, the measurement of speeds with TEA lasers raises a problem, since pulser at frequencies which are close to that of light cannot be measured. To get over this problem, a heterodyne detection is then used, well known to anyone skilled in the art by beating, with the emission, a conventional low pressure continuous wave laser, whose emission frequency can be perfectly well stabilized.

The emission of a TEA laser is effected in several simultaneous longitudinal modes corresponding to the different frequencies of the spontaneous photons stimulating the photon avalanche at frequencies compatible with the length of the resonant cavity of the laser. A TEA laser is thus a multimode laser with a wide amplification band.

Beating between a TEA laser and a continuous wave laser is effected in the central mode of the TEA laser, the TEA laser having been previously transformed in a way known per se into a monomode pulsed laser so as not to lose the energy of the other longitudinal modes of a TEA laser. Hybrid lasers, frequency injection lasers or short cavity lasers are known as monomode TEA lasers, for example, from the article by Scott et al entitled a "Stabilization of singe mode TEA laser", and published in Optics Communications, Vol. 50, No. 5, July 1, 1984. Since the invention does not concern the transformation of a multimode TEA laser into a monomode TEA laser it is pointless here to dwell further on this technique of adaptation.

Although, as was mentioned above, it is perfectly possible to control the frequency of a continuous wave laser, it is absolutely not so for the frequency of the central mode of known TEA lasers and more generally for the frequency of pulsed lasers, because the laser gas medium is in full expansion at the moment when the laser emission appears and when the optical length of the cavity varies. Even if the frequency of the continuous wave selection laser of a frequency injection laser were somewhat varied for example, the emission frequency of the pulsed laser would always correspond to the natural frequency of the mode of the pulsed cell which was the closest to the frequency of the continuous wave selection laser.

It can thus be readily understood that beating between a continuous wave laser and a pulsed laser with an unstabilized frequency may give rise to a quite prejudicial sliding phenomenom (chirp) and which it is therefore natural to desire to eliminate.

Phase conjugate or frequency shift mirrors are also known. These are solid or liquid gas media with a non linear absorption coefficient whose function is to reflect for example, an incident wave front with partial phase shift, i.e. provided with a distortion, as a reflected wave front with partial but inverted or reversed or conjugate phase shift.

The function of these phase conjugate mirrors is perfectly well described in the prior art, more especially in U.S. Pat. No. 4,233,571.

Conjugate mirrors are already known, more especially and once again from this U.S. patent, called four wave mixing phase conjugate mirrors, comprising a non linear medium and at least one external pumping laser, generally two, for emitting two pumping wave fronts incident on the non linear medium at the same frequency and in two directions opposite each other. A third wave front incident on the non linear medium, but provided with a phase or frequency distortion, is reflected under the action of the three incident wave fronts as a fourth phase conjugate wave front.

Thus, a degenerated or distorted wave front at frequency $\omega + \delta$, after for example undergoing a distortion $+\delta$ at the level of a laser medium, and incident on such a mirror, is reflected, as in all other phase conjugate mirrors, as a wave front at frequency $\omega - \delta$. On its return path, and after passing through the laser medium, the reflected wave front which again has undergone the same distortion $+\delta$ returns then to the frequency $\omega$. The function of the non linear medium device associated with two pumping lasers of U.S. Pat. No. 4,233,571 is therfore to obtain a wave front correction. Lasers associated with a non linear medium only provide a pumping function. This device aims at purifying the central emission mode of a laser.

It will be noted consequently that the problem of frequency stabilization set forth above is not at all dealt with in this U.S. patent of the prior art.

The article "A theoretical and experimental investigation of the modes of optical resonants with phase conjugate mirrors" by Auyeung et al, appearing in the IEEE Journal of Quantum Electronics, vol. QE-15, No. 10, October 1979, teaches recopying into a first pulsed laser the frequency of a second pulsed pumping laser from a phase conjugate mirror. However, this article is not concerned with stabilizing the frequency of the first pulsed laser and all the more so since the frequency of the second pulsed laser is not in itself stable.

The article "Demonstration of the longitudinal modes and aberration-correction properties of a continuous wave dye laser with a phase conjugate mirror" by Lind et al, appearing in the review Optics Letters, Vol.

6, No. 11, November 1981, teaches stabilizing a continuous wave laser at the frequency of a continuous wave pumping laser of a phase conjugate mirror. However, no teaching may be drawn from this article for stabilizing a pulsed laser.

The problem of frequency stabilization of a pulsed laser remains then unsolved, and it is this problem which the applicant has solved.

SUMMARY OF THE INVENTION

Consequently, the present invention relates to a pulsed laser system comprising a first laser medium with pulsed excitation in a resonant cavity formed between two mirrors one of which is a four wave mixing phase conjugate mirror comprising a secondary non linear medium associated with at least one pumping laser for sending two pumping beams incident on the secondary medium in two opposite directions and at the same frequency, said laser system being characterized by the fact that the secondary non linear laser medium is a saturable amplifying medium and the pumping laser is a continuous wave laser at a stable frequency equal to the frequency of the spontanteous photons which trigger off the emission, at the frequency to be stabilized, of the pulsed laser system.

The invention is remarkable by the progress which it makes, since this is the first time that the frequency stabilization of a pulsed laser has been truly proposed.

The invention is also remarkable, for it goes against a preconceived idea. As mentioned above, it had already been proposed to combine a pulsed laser and a phase conjugate mirror with a pulsed pumping laser, on the one hand, or a continuous wave laser and a phase conjugate mirror with a continuous wave pumping laser, on the other hand. However, no one had ever thought of combining the three notions of pulsed emission, continuous wave emission and frequency stabilization of the pulsed emission.

The preconceived idea was all the more deep rooted in minds since the first theory formed about four wave mixing in an amplifying medium was false. According to this theory, only a high power laser and so a pulsed pumping laser for a phase conjugate mirror was capable of bringing under control, but not of stabilizing, the frequency of a pulsed main laser. Now, the truth was reestablished in an article entitled "Phase conjugation in saturable amplifiers by degenerate frequency mixing", by Reintjes et al appearing in the review IEEE Journal of Quantum Electronics, vol. QE-18, No. 11, November 1982, according to which the pumping wave was also amplified in the non linear medium by giving rise to the conjugate effect. However, the authors of this article did not, for all that, conclude that it was therefore possible to combine a pulsed main laser, a phase conjugate mirror and a continuous wave pumping laser. The reestablishment of the truth could therefore only direct anyone skilled in the art to use a low power pulsed laser as a pumping laser.

Finally, and through the invention, a pulsed laser may now be frequency stabilized by means of a continuous wave laser whose frequency can be perfectly well stabilized, its spectral purity only being limited by the finite duration of the gain in its amplifying medium.

In a four wave mixing phase conjugate mirror, if the incident frequency, or probe, is $\omega_i$, the conjugate reflected frequency $\omega_c$, and the pumping frequencies $\omega_1$ and $\omega_2$, we have the relationship:

$$\omega_c = \omega_1 + \omega_2 - \omega_i$$

if $\omega_1 = \omega_2 = \omega$, $$\omega_c = 2\omega - \omega_i$$

If the frequency of the spontaneous photons of the pulsed laser is $\omega$ and if this frequency undergoes a shift $+\delta$ in the laser medium, then $$\omega_i = \omega + \delta$$

$$\omega_c = 2\omega - (\omega + \delta) = \omega - \delta,$$

the frequency of the reflected photons which will trigger off the avalanche being also $(\omega - \delta) + \delta = \omega$.

If the frequency of the spontaneous photons is different from $\omega$, then the frequency of the reflected photons, with in addition a reduced intensity, will not be the same as that of the spontaneous photons and the avalanche of the laser effect cannot occur. In other words, only the spontanteous photons at the continuous wave pumping frequency of phase conjugate mirror may cause the laser effect.

It will be noted that the power of the continuous wave pumping laser of the mirror may be very low.

It will also be noted that the mirror of the pulsed laser of the invention behaves as a reflecting frequency filter and that the laser is a single mode laser whose geometry is identical to that of the pump laser.

The pulsed laser of the invention comprises a phase conjugate mirror which may be pumped by one or two continuous wave lasers. When a single continuous wave laser is used, the phase conjugate mirror further comprises, and for example, a first semi transparent mirror and a second mirror, both known, or any other optical beam dividing means.

Of course, the invention applies more particularly to a pulsed laser with gas medium under high pressure, of the order of an atmosphere, and with transverse excitation (TEA laser), the laser medium comprising advantageously $CO_2$.

BRIEF DESCRIPTION OF THE DRAWINGS

The invention will be better understood from the following description of two embodiments of the pulsed laser of the invention, with reference to the accompanying drawings in which:

FIG. 1 shows schematically one embodiment of the pulsed laser system of the invention, in its general principle, and FIG. 2 shows schematically the preferred embodiment of the laser system of the invention.

DESCRIPTION OF THE PREFERRED EMBODIMENTS

The pulsed laser system of FIG. 1 comprises a main cell containing a first amplifying laser medium TEA 1, at atmospheric pressure, confined in a case 2, and subjected to a pulsed transverse electric excitation, by means of two electrodes 3, 4 extending longitudinally inside the case 2. A capacitor 5 has plates which are connected respectively to electrodes 3, 4 through a spark gap 13 which plays the role of a switch. A voltage source 6 is connected across the terminals of capacitor 5 for its excitation discharge. The laser medium 1 extends in a resonant cavity formed between a first conventional semi transparent mirror 7, called an output mirror, and a four wave mixing phase conjugate mirror 8.

The phase conjugate mirror 8 comprises a non linear saturable amplifying TEA medium 12 in a secondary cell 9, similar to the main cell. The non linear medium of cell 9 is pumped by two continuous wave frequency stabilized lasers 10, 11 sending to this medium two pumping light beams at the same frequency and in two vectorially opposite directions.

Only the spontaneous photons of the first TEA medium 1 at the frequency of the pump lasers 10, 11 will cause the avalanche of the laser effect in the main cell.

In the preferred embodiment of the laser system of FIG. 2, in which the pulsed excitation means are not shown, the secondary cell of the phase conjugate mirror is created in the main cell whose frequency is to be stabilized.

A main cell 20 includes a case 22, in which electrodes 23, 24 and a TEA medium 21 are confined. Cell 20 is disposed in a resonant cavity formed between conventional reflecting mirror 27 and a part 30 of its laser medium 21 confined in case 22.

With this main cell is associated a phase conjugate mirror comprising a frequency stabilized continuous wave pumping laser 29, the part 30 of the TEA medium 21 in case 22 as a non linear medium, a focusing lens 31 for defining this part 30, and an optical isolator 28 on side of the TEA medium 21, and the mirror 27 on the other side of the TEA medium 21, all these means being aligned along an axis 32. The length of the non linear medium part 30 may be optimized by using a lens 31 of appropriate focal distance.

A first optical pumping beam is emitted directly by the continuous wave laser 29, from the left towards the right in FIG. 2. This beam passes through the isolator 28, which may for example be a polarizer associated with a quarter wave mirror or a Faraday rotator, lens 31, and through the laser medium and is reflected by mirror 27 so as to form a second optical pumping beam in the opposite direction, from the right towards the left in FIG. 2.

A part of the amplifying laser medium 21 whose frequency is to be stabilized forms then, because of the presence of lens 31, the non linear medium 30 of the phase conjugate mirror. The two media, which only form one, of the main and second cells are thus advantageous confined in the same case. A second independent cell, for the phase conjugate mirror, and a second continuous wave pumping laser are thus eliminated.

The light emission of the laser which has just been described exits, at a frequency stabilized to that of the continuous wave laser 29, through the isolator 28, after reflection in a direction 33 transversely of the axis 32. The phase conjugate mirror is therefore in this embodiment the output mirror of the cavity. If the reflectivity of the phase conjugate mirror is greater than unity, then the laser beam may be extracted by mirror 27 which will then be semi transparent.

For the effective construction of this pulsed laser system, the applicant used as the TEA medium, and by way of example, a gas medium comprising in this case $CO_2$ and a $CO_2$ continuous wave pumping laser, of a very low power on the order of 4 watts and emitting at a wave length of about 10 $\mu$m.

It should be emphasized here that although a frequency stabilized TEA laser has been described, the invention also applies to any other pulsed laser.

What is claimed is:

1. A frequency-stabilized, pulsed laser system, comprising:

(a) pulsed main laser means for generating and emitting a pulsed output laser beam having an output frequency to be stabilized, said pulsed laser means including a pair of laser beam reflectors spaced apart of each other along an optical path and bounding a resonant cavity therebetween, and a non-linear, main lasing medium contained in the resonant cavity, one of the reflectors being a phase conjugate reflector means containing a saturable, non-linear reflector medium; and (b) means for stabilizing the output frequency of the pulsed output laser beam, including a continuous wave pumping laser means for generating and directing a continuous pumping laser beam in opposite co-linear directions along a pumping path through the saturable, non-linear reflector medium, said continuous pumping laser beam having a stabilized pump frequency which equals the output frequency of the pulsed output laser beam, thereby providing frequency stability.

2. The system as recited in claim 1, wherein the pulsed main laser means includes a main cell in which the main lasing medium is contained, and wherein the phase conjugate reflector means includes a secondary cell in which the saturable reflector medium is contained, and wherein the cells are spaced apart of each other along the optical path along which the pulsed output laser beam travels.

3. The system as recited in claim 1, wherein the pulsed main laser means includes a main cell in which the main lasing medium is contained, and wherein the phase conjugate reflector means includes means for selecting a part of the main lasing medium within the main cell to serve as the saturable, non-linear reflector medium.

4. The system as recited in claim 3, wherein the selecting means includes a focusing lens situated in the pumping path, and operative for focusing the pumping laser beam at said part of the main lasing medium.

5. The system as recited in claim 4, wherein the pumping and optical paths are co-linear for a shared path portion; and further comprising isolator means situated in the shared path portion, for isolating the pumping and the output laser beams, and for diverting the output laser beam from the optical path.

6. The system as recited in claim 5, wherein the other reflector is a reflecting mirror.

7. The system as recited in claim 6, wherein the continuous wave pumping laser means constitutes a single continuous wave pump laser source.

8. The system as recited in claim 2, wherein the continuous wave pumping laser means constitutes a pair of continuous wave pumping laser sources operative for generating and directing two continuous pumping laser beams in opposite co-linear directions along a common pumping path, each pumping laser beam having the same stabilized pump frequency.

9. The system as recited in claim 8, wherein the other reflector is a semi-transparent mirror.

10. The system as recited in claim 1, wherein the pulsed main laser means includes means for transversely exciting the main lasing medium.

11. The system as recited in claim 10, wherein the main lasing medium is carbon dioxide gas.

12. The system as recited in claim 1, wherein the continuous wave pumping laser means includes means for transversely exciting the reflector medium.

13. The system as recited in claim 12, wherein the reflector medium is carbon dioxide gas.

* * * * *